United States Patent
Vrankovic et al.

(10) Patent No.: US 11,404,869 B2
(45) Date of Patent: Aug. 2, 2022

(54) APPARATUS FOR DISTRIBUTING DC BUS POWER AND CONTROL POWER OVER COMMON CONDUCTORS IN A DISTRIBUTED DC BUS SYSTEM

(71) Applicant: Rockwell Automation Technologies, Inc., Mayfield Heights, OH (US)

(72) Inventors: Zoran Vrankovic, Greenfield, WI (US); Mark A. Gries, Wauwatosa, WI (US); Craig R. Winterhalter, Cedarburg, WI (US); Arun K. Guru, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 79 days.

(21) Appl. No.: 16/408,804

(22) Filed: May 10, 2019

(65) Prior Publication Data
US 2020/0358285 A1 Nov. 12, 2020

(51) Int. Cl.
*H02J 1/08* (2006.01)
*H02M 7/12* (2006.01)

(52) U.S. Cl.
CPC ............ *H02J 1/08* (2013.01); *H02M 7/12* (2013.01)

(58) Field of Classification Search
CPC ........... H02J 1/08; H02J 13/0003; H02M 7/12
See application file for complete search history.

(56) References Cited

U.S. PATENT DOCUMENTS 9,912,151 B2 * 3/2018 Tenca .................. H02J 1/12
2014/0320048 A1 10/2014 Vrankovic et al.

FOREIGN PATENT DOCUMENTS

WO 2019/011444 A1 1/2019

OTHER PUBLICATIONS

Siemens—"Sinamics S120 Cabinet Modules", Equipment Manual, Oct. 1, 2008, pp. 1-456, XP055707624, DE Retrieved from the Internet: URL:https://inverterdrive.com/file/Sinamics-S120-Equipment-Manual [retrieved on Jun. 22, 2020] * p. 149; figures 2-1 (p. 22), Fig. 4-8 (p. 63), 5-18 (p. 149)—(456) pages.

(Continued)

*Primary Examiner* — Menatoallah Youssef
*Assistant Examiner* — Colleen J O Toole
(74) *Attorney, Agent, or Firm* — Boyle Fredrickson, SC

(57) ABSTRACT

A system for distributing DC bus voltage and control power to multiple motors includes a rectifier front end supplying a DC bus voltage and a DC control voltage. Both the DC bus voltage and the DC, control voltage are distributed via a common set of conductors. Diodes are operatively connected between the DC control voltage and the common set of conductors. The diodes allow forward conduction of the DC control voltage and distribution of control power to distributed devices when the DC bus voltage is not present. Once the DC bus voltage is present, the diodes block conduction of the DC control voltage. Each of the distributed devices are configured with an internal power supply that is operative to generate an internal control voltage from either the DC control voltage or the DC bus voltage.

20 Claims, 7 Drawing Sheets

(56) References Cited

OTHER PUBLICATIONS

G. I. C Lobato et al; "Powerline Communication (PLC) through power converter's DC bus: Applicability assessment", 2015 IEEE 13th Brazilian Powser Electronics Conference and 1st Southern Power Electronics Conference (COBEP/SPEC), Nov. 1, 2015 (Nov. 1, 2015), pp. 1-5, XP055708385, DOI: 10.1109/COBEP.2015. 7420117; ISBN: 978-1-4799-8779-5 * figure 1 *- (7) pages.
Extended European Search Report dated Jul. 2, 2020; Application No. 20171494.6-1202—(10) pages.
European Communication Pursuant to Article 94(3) EPC; Application No. 20 171 494.6 dated Sep. 14, 2021—(6) pages.

* cited by examiner

APPARATUS FOR DISTRIBUTING DC BUS POWER AND CONTROL POWER OVER COMMON CONDUCTORS IN A DISTRIBUTED DC BUS SYSTEM

BACKGROUND INFORMATION

The subject matter disclosed herein relates to a method of delivering power and control voltages in a distributed DC bus system. More specifically, a system of delivering power and control voltages over common conductors in a distributed DC bus system is disclosed.

A distributed DC bus system supplies DC power to multiple loads from a single DC source. One application for a distributed DC bus is found in industrial control, A controlled machine or process may have multiple axes of motion, where each axis is controlled by a motor. A single rectifier front end is provided to convert, for example, a three-phase AC voltage from a utility supply to a DC voltage. The three-phase AC voltage may be, for example, 230 VAC or 460 VAC and the resulting DC voltage supplied on the distributed DC bus may be 325 VDC or 650 VDC, respectively. The power rating of the rectifier front end is sufficient to supply enough current at the corresponding DC voltage level to multiple motor drives via the distributed DC bus. A first set of conductors is provided to supply the DC bus voltage from the rectifier front end to each motor drive in the system. Each motor drive receives the DC voltage and supplies a controlled AC voltage, having a variable amplitude and variable frequency, to a motor connected to the motor drive to achieve desired operation of the motor.

However, in addition to the DC bus voltage required to generate the AC voltage used to control rotation of the motor, each motor drive requires a control voltage to supply power to control circuits such as a microprocessor executing within the motor drive, logic circuits, gate drive circuits, analog-to-digital converters, digital-to-analog converters, communication circuits, and the like. The control voltage is commonly at or below 50 VDC, which is considered a safe voltage that does not require further guarding against accidental contact, and is similarly distributed to the motor drives. In many applications, it is desirable to have the control voltage present without having the DC Bus voltage present. During, commissioning, for example, the control voltage is required to enable a technician to set parameters on the motor drive that will define how the motor controlled by the motor drive will operate. Consequently, the control voltage is supplied independently of the DC bus voltage. Either a separate power supply generates the control voltage or the rectifier front end is configured to supply the control voltage via an output separate from the DC bus voltage. A second set of conductors is provided to connect the control voltage to each of the motor drives. However, because the current and power rating of the control voltage is much less than the current and power rating required to supply power to control rotation of the motor, the size of the wires utilized for distributing control power to the motor drives is correspondingly less than the size of the wires or than the bus cross-section utilized for distributing DC bus voltage to the motor drives.

Use of the smaller size wire to distribute control power to motor drives is not without certain drawbacks, Smaller wire has a greater resistance per unit length than a larger wire. Thus, wire used to distribute control power has a greater resistance than wire used to distribute the DC bus voltage when run the same distance. If the control power is also distributed from the rectifier front end to each motor drive, this resistance per unit length can generate a voltage drop on the control power conductors that may limit the distance that a motor drive may be located from the rectifier front end.

Thus, it would be desirable to provide a system for distributing DC bus voltage and control power to multiple motors with an increased distance that the motor drive may be positioned from the rectifier front end.

Additionally, a motor may require external devices connected to the motor which, in turn, require control power to operate. The motor may include a brake and/or a fan which operate from the control power to the motor. A brake requires a significant current to energize the brake coil to release the brake. The system must be configured to supply the current required during operation if each brake coil is energized in tandem. The current required by the brakes may limit the number of brakes and, therefore, limit the number of motors that may be connected to a single power supply. The total power drawn from the control power supply is equal to the amplitude of the voltage times the amplitude of the current, if the power supply must be able to supply power to control components within the motor drive as well as to supply power to external components connected to the motor, the number of motors receiving control power from a single power supply is reduced. Additional power supplies may, therefore, be required either within a central control cabinet or distributed around the controlled machine or process to provide the required control power.

Thus, it would be desirable to provide a system capable of supplying control power to an increased number of motor drives, reducing the number of power supplies required within an application.

In order to supply both DC bus voltage and control power from the rectifier front end, cables are required for each. Additionally, the rectifier front end commonly requires communication with the motor drive, requiring still another cable for communication. One method of providing the DC bus voltage, control power, and communications between the rectifier front end and each motor drive is to supply three separate cables. A first cable supplies the DC bus voltage, a second cable provides the control power, and a third cable transmits data packets between the devices. The first cable includes three conductors and may include a shield within a jacket or housing, where the three conductors are for the positive DC bus voltage, the negative DC bus voltage, and a ground connection. The second cable includes two conductors and a shield within a jacket or housing, where the two conductors are for the positive control voltage and the negative control voltage. The third cable includes a pair of transmit conductors, a pair of receive conductors, and a shield within a jacket or housing. Each of the three cables must be routed between the rectifier front end and a motor drive.

Routing three cables, however, requires additional cost, space, and wiring time during assembly of the controlled machine or process. To facilitate assembly, it is known to provide a bundled cable. In one option, the DC bus voltage cable and the control power cable are bundled into a single cable, and the communication cable is routed separately. The bundled DC bus voltage and control power cable includes the five conductors within the jacket, where two conductors are provided for DC bus voltage, one conductor is a ground conductor and two conductors are provided for the control voltage such that both the DC bus voltage and the control power and included within a single cable. In another option, all three of the previously discussed cables (e.g., DC bus voltage cable, control power cable, and communication cable) may be bundled into a single cable. While the number of cables that must be routed and assembled is decreased, the number of conductors remains the same. The single bundled cable includes nine conductors where each of the three separate cables similarly require nine conductors total between the three cables. The number of connections is not reduced, the weight per unit length of the cable increases, and the flexibility of the cable decreases as an increased number of conductors must be bent at the same time.

Thus, it would be desirable to provide a system for distributing DC voltage and control power in a distributed DC bus system that simplifies wiring without incurring the disadvantages of the bundled cables.

BRIEF DESCRIPTION

The subject matter disclosed herein describes a system for distributing DC bus voltage and control power to multiple motors that is not limited in length by a smaller control wire. A rectifier front end receives AC voltage as an input and converts the AC voltage to a DC bus voltage. The rectifier front end also receives a control voltage which it may first convert to a desired DC control voltage or pass directly on to other devices if the control voltage received is at the desired DC control voltage. Both the DC bus voltage and the DC control voltage are distributed via a common set of conductors. Consequently, the system distributes DC bus voltage and control power without incurring the disadvantages of bundled cables. Diodes are operatively connected between the DC control voltage and the DC bus such that the diodes are forward biased when the DC control voltage is present and the DC bus voltage is not present, and the diodes are reverse biased when the DC control voltage is present and the DC, bus voltage is present. The diodes allow forward conduction of the DC control voltage and distribution of control power to distributed devices when the DC bus voltage is not present. Once the DC bus voltage is present, the diodes block conduction of the DC control voltage. Each of the distributed devices are configured with an internal power supply that is operative to generate an internal control voltage from either the DC control voltage or the DC bus voltage. Because the external devices on the motor are not required to operate without DC bus voltage present, the distributed device may draw DC bus voltage to power the external devices, and the system no longer requires control power for operation of external devices on the motor.

According to a first embodiment of the invention, a distributed DC bus system includes a first input configured to receive an AC input voltage, a rectifier section operative to convert the AC input voltage to a DC bus voltage having a first amplitude, a DC bus electrically connected to the rectifier section and operative to receive the DC bus voltage, and a pair of diodes operatively connected between a DC control voltage and the DC bus. The DC control voltage is less than the DC bus voltage, and at least one motor drive is operatively connected to the DC bus. The pair of diodes are operatively connected to be forward biased when the DC control voltage is present in the distributed DC bus system and the DC bus voltage is not present on the DC bus, and the pair of diodes are operatively connected to be reverse biased when the DC control voltage is present in the distributed DC bus system and the DC bus voltage is present on the DC bus. Each motor drive includes an inverter section electrically connected to the DC bus to receive the DC bus voltage as an input and to provide an AC voltage as an output and a power supply electrically connected to the DC bus. The power supply is operative to output a motor drive control voltage from either the DC bus voltage or the DC control voltage present on the DC bus.

According to another embodiment of the invention, a distributed DC bus system includes a first input configured to receive an AC input voltage, a rectifier section operative to convert the AC input voltage to a DC voltage having a first amplitude, a DC bus electrically connected to the rectifier section and operative to receive the DC bus voltage, and a pair of diodes operatively connected between a DC control voltage and the DC bus, where the DC control voltage is less than the DC bus voltage. The pair of diodes are operatively connected to be forward biased when the DC control voltage is present in the distributed DC bus system and the DC bus voltage is not present on the DC bus, and the pair of diodes are operatively connected to be reverse biased when the DC control voltage is present in the distributed DC bus system and the DC bus voltage is present on the DC bus. The DC bus is configured to be electrically connected between the rectifier section and at least one motor drive. Each motor drive includes an inverter section operative to output an AC output voltage from the DC bus voltage received as an input, and each motor drive includes a power supply operative to output a motor drive control voltage from either the DC bus voltage or the DC control voltage present on the DC bus.

According to still another embodiment of the invention, a distributed DC bus system includes a DC bus electrically connected to a rectifier front end and operative to selectively receive either a DC bus voltage or a DC control voltage and at least one motor drive operatively connected to the DC bus. Each motor drive includes an inverter section electrically connected to the DC bus to receive the DC bus voltage as an input and to provide an AC voltage as an output and a power supply electrically connected to the DC bus. The power supply is operative to output a motor drive control voltage from either the DC bus voltage or the DC control voltage present on the DC bus.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
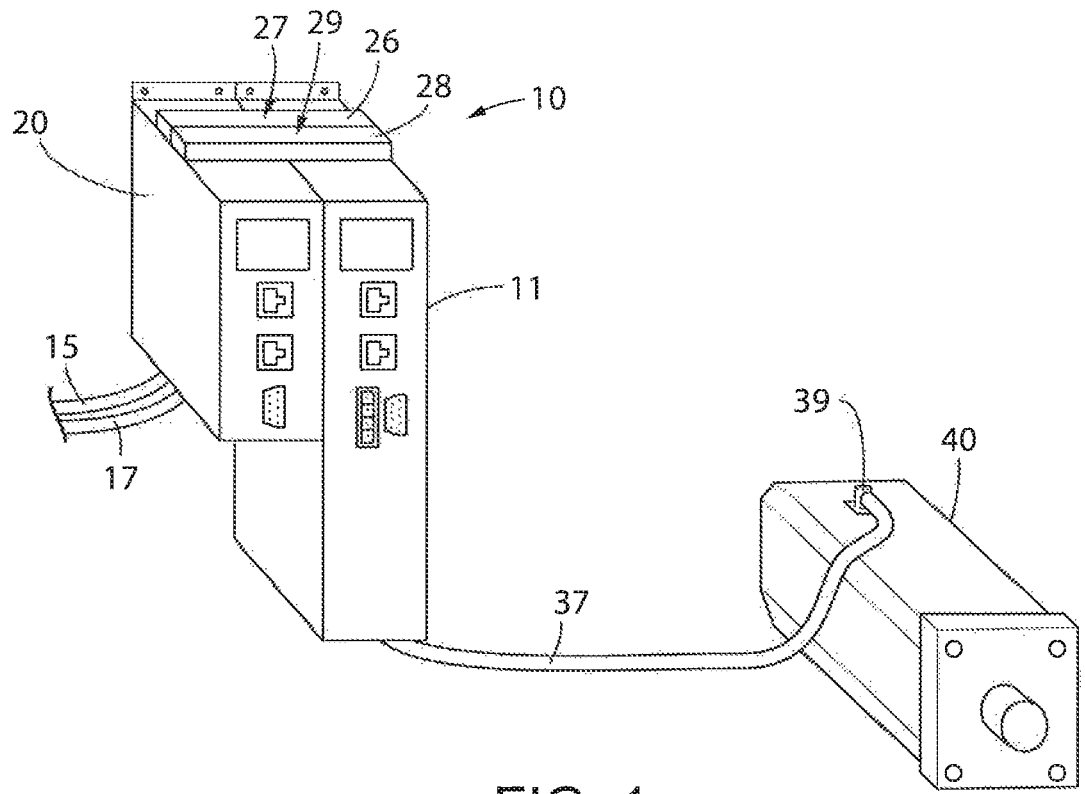
FIG. 1 is an exemplary motor, panel mounted motor drive, and front-end rectifier incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 2:
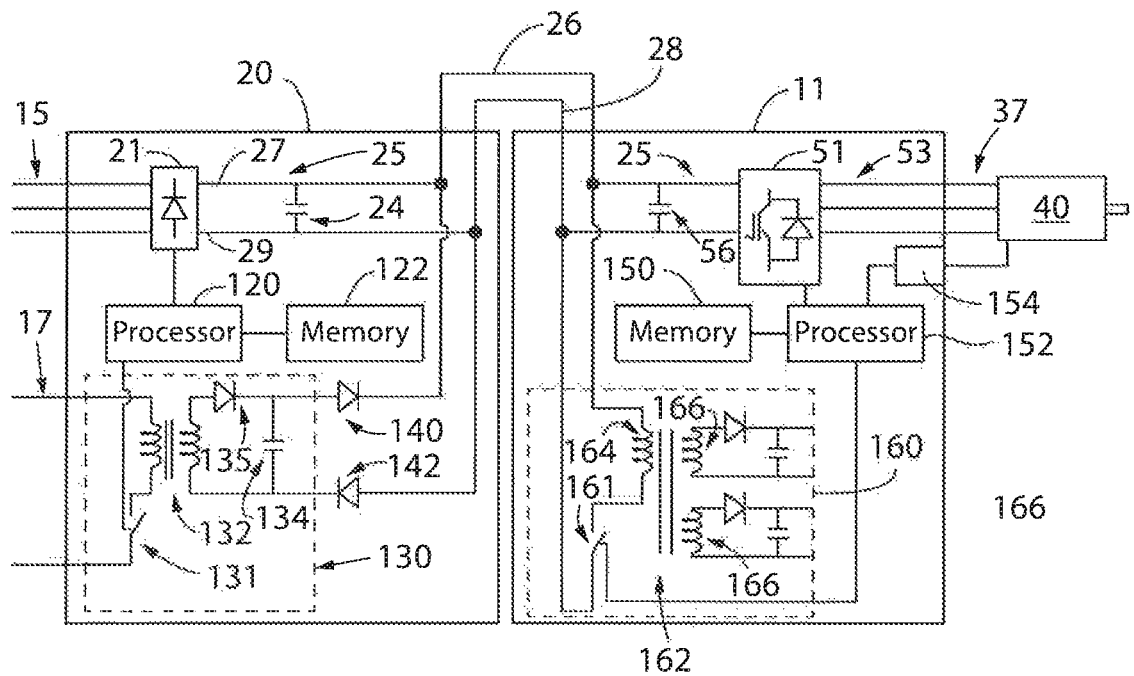
FIG. 2 is a block diagram representation of the motor, motor drive, and front-end rectifier of FIG. 1.
Figure 5:
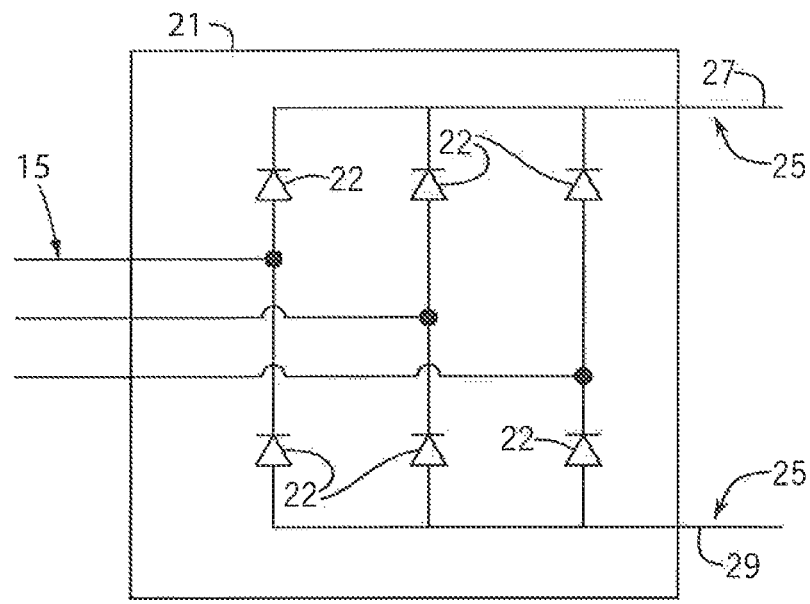
FIG. 5 is a schematic representation of a passive rectifier that may be incorporated into the front-end rectifier of FIG. 1 or 3.

Turning initially to FIGS. 1 and 2, an exemplary motor control system 10, which may be used in conjunction with, the various embodiments of the invention disclosed herein, is illustrated. According to the exemplary embodiment, the motor control system 10 includes a front-end rectifier 20 and a motor drive 11. Although illustrated as separate components, it is contemplated that some embodiments will include a front-end rectifier and motor drive as a single component. The front-end rectifier 20 is configured to receive a three-phase AC voltage 15 at an input to a rectifier section 21. The rectifier section 21 may include any electronic device suitable for passive or active rectification as is understood in the art. With reference also to FIG. 5, the illustrated rectifier section 21 includes a set of diodes 22 forming a diode bridge that rectifies the three-phase AC voltage to a DC voltage on the DC bus 25. Optionally, the rectifier section 21 may include other solid-state devices including, but not limited to, thyristors, silicon-controlled rectifiers (SCRs), insulated-gate bipolar transistors (IGBTs), power metal-oxide semiconductor field-effect transistors (MOSFETs), or other transistors or solid-state devices to convert the input power 15 to a DC voltage for the DC bus 25. The DC voltage is present between a positive rail 27 and a negative rail 29 of the DC bus 25.

The front-end rectifier 20 also includes a DC bus capacitance 24 connected between the positive and negative rails, 27 and 29, to reduce the magnitude of the ripple voltage resulting from converting the AC voltage to a DC voltage. It is understood that the DC bus capacitance 24 may be a single capacitor or multiple capacitors connected in parallel, in series, or a combination thereof. According to one embodiment of the invention, the positive rail 27 is at a voltage potential generally equal to or boosted above the magnitude of the peak of the AC input voltage and the negative rail 29 is at a voltage potential at zero volts, where the negative rail 29 may be a floating common or tied to an earth ground. According to the another embodiment of the invention, the DC bus capacitance 24 may be arranged in a split-bus configuration, such that a first portion of the DC bus capacitance 24 is connected between the positive rail 27 and a ground connection, and a second portion of the DC bus capacitance 24 is connected in series with the first portion of the DC bus capacitance between the ground connection and the negative rail 29. The total voltage potential across the DC bus 25 in the split bus configuration remains generally equal to or boosted above the magnitude of the peak of the AC input voltage, but the voltage potential across each portion of the capacitance 24 is one-half of the total DC bus voltage.

Similarly, the front-end rectifier 20 may also receive a control voltage 17 for distribution to each of the motor drives 11. According to the embodiment illustrated in FIG. 2, the control voltage is a 24 VDC input voltage. The front-end rectifier 20 includes a control power supply 130, which is a switched mode power supply. A switch 131, which may be implemented by a transistor, is selectively opened and closed to establish conduction through a transformer 132. The inductive nature of the transformer, in combination with the diode 133 and capacitor 134 work in combination with the switch 131 to boost the 24 VDC at the input 17 to a 48 VDC control voltage at the output of the control power supply 130. In addition, the transformer 132 provides electrical isolation between the control voltage at the input 17 and the control voltage at the output of the power supply 130. A pair of diodes 140, 142 are connected between the output of the control power supply 130 and the DC bus 25. As will be discussed in more detail below, the pair of diodes 140, 142 allow the 48 VDC control voltage to be present on the DC bus 25 when the DC bus voltage output from the rectifier section 21 is not present and disconnect the control power supply 130 from the DC bus 25 when the DC bus voltage output from the rectifier section 21 is present.

Figure 4:
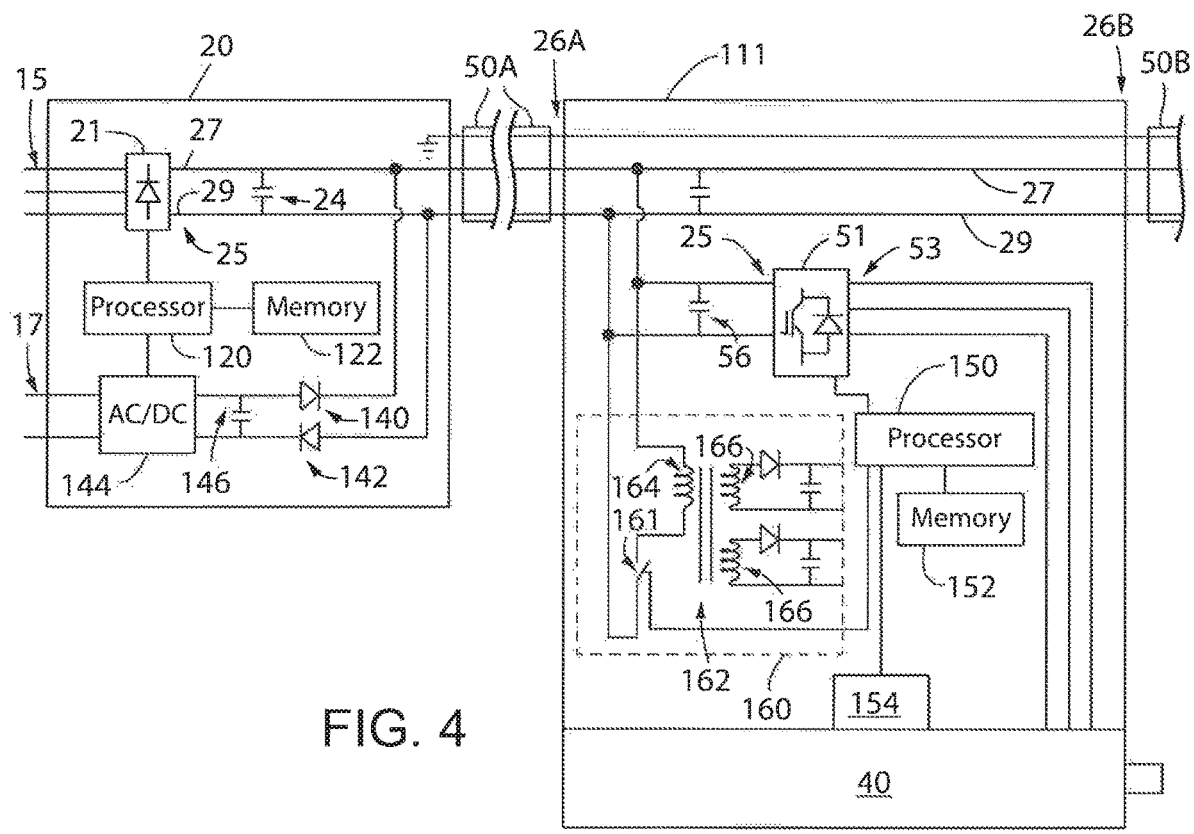
FIG. 4 is a block diagram representation of the motor, motor drive, and front-end rectifier of FIG. 3.

According to another embodiment of the invention, as shown in FIG. 4, it is contemplated that the control voltage 17 is a single-phase AC input, such as 115 VAC. The front-end rectifier 20 may further include a voltage regulator 144 that converts the AC input to the 48 VDC control voltage. A capacitor 146 is provided at the output of the voltage regulator 144 to help smooth any ripple of the DC voltage and/or to provide some ride through due to the loss of the AC input. Optionally, the capacitor 146 may be incorporated within the voltage regulator 144. Once again, a pair of diodes 140, 142 are connected between the output of the voltage regulator 144 and the DC bus 25. As will be discussed in more detail below, the pair of diodes 140, 142 allow the 48 VDC control voltage to be present on the DC bus 25 when the DC bus voltage output from the rectifier section 21 is not present and disconnect the voltage regulator 144 from the DC bus 25 when the DC bus voltage output from the rectifier section 21 is present.

According to still another embodiment of the invention (not shown) it is contemplated that a 48 VDC voltage may be supplied as a control voltage 17 input to the rectifier 20. If the 48 VDC voltage is referenced to the negative potential on the DC bus voltage, the front-end rectifier 20 may include just the pair of diodes 140, 142 to selectively connect the control voltage input 17 to the DC bus 25 as a function of whether the DC bus voltage output from the rectifier section 21 is present. Alternately, an isolation transformer 132 may be provided which provides a one-to-one turns ratio while also establishing electrical isolation between the control voltage input and the control voltage output. The output of the isolation transformer is then connected to the pair of diodes 140, 142 to selectively connect the 48 VDC to the DC bus 25. Various other sources of 48 VDC as a control voltage may be provided for selectively connecting to the DC bus 25 via the diodes 140, 142 without deviating from the scope of the invention. Similarly, it is contemplated that the control voltage may be selected at other DC voltage levels, such as 24 VDC, where the magnitude of the control voltage is less than the magnitude of the DC bus voltage level, without deviating from the scope of the invention.

The front-end rectifier 20 further includes a control circuit used to control operation of the rectifier. According to the illustrated embodiment, the control circuit includes a processor 120 and a memory 122. One or more modules are used to control operation of the front-end rectifier 20. The modules may be programs stored in the memory 122 and executed on the processor 120, logic circuits, or a combination thereof. The memory 122 is configured to store data and programs, which include a series of instructions executable by the processor 120. It is contemplated that the memory 122 may be a single device, multiple devices, or incorporated, for example, as a portion of another device such as an application specific integrated circuit (ASIC). The processor 120 is in communication with the memory 122 to read the instructions and data as required to control operation of the front-end rectifier 20. The processor 120 receives input signals from input terminals, communication circuits, such as an industrial network, and the like, which include, for example, an enable signal, a disable signal, or other command signals defining desired operation of the rectifier 20. The processor 120 similarly receives feedback signals from sensors indicating the present operation of the rectifier 20. The feedback signals may include, but are not limited to, the magnitude of voltage and/or current present at the input power 15, the control voltage input 17, or on the DC bus 25. The processor 120 executes a control module responsive to command signal(s) and the feedback signals to generate control signals, if necessary, for an active rectifier or for the switched mode control power supply 130.

As illustrated in FIG. 1, a single motor drive 11 is connected to the front-end rectifier 20 to receive the DC voltage present on the DC bus 25. A pair of bus bars 26, 28 conduct the voltages present on the positive and negative rails 27, 29 between the rectifier 20 and the drive 11. It is understood that still additional motor drives 11, may be mounted adjacent to the illustrated motor drive and the bus bars 26, 28 may extend from the front-end rectifier 20 to each of the adjacent motor drives, extending the DC bus 25 to the additional motor drives 11. Each motor drive 11 connected to the DC bus 25 receives the DC voltage present on the bus and uses the DC voltage to control one or motors 40 connected to the corresponding motor drive 11. According to the embodiment illustrated in FIGS. 7-9, a DC bus connection member 200 includes a housing 202 in which the bus bars 26, 28 are mounted. Terminals 206 on the upper surface of each motor drive 11 are configured to receive the bus bars 26, 28. Each pair of terminals 206 on one motor drive 11 are connected to the positive rail 27 and negative rail 29 of the DC bus 25 within the corresponding drive. DC bus connection members 200 of varying length may be supplied to connect terminals 206 between adjacent motor drives 11 according to the width of the corresponding drives 11.

Figure 6:
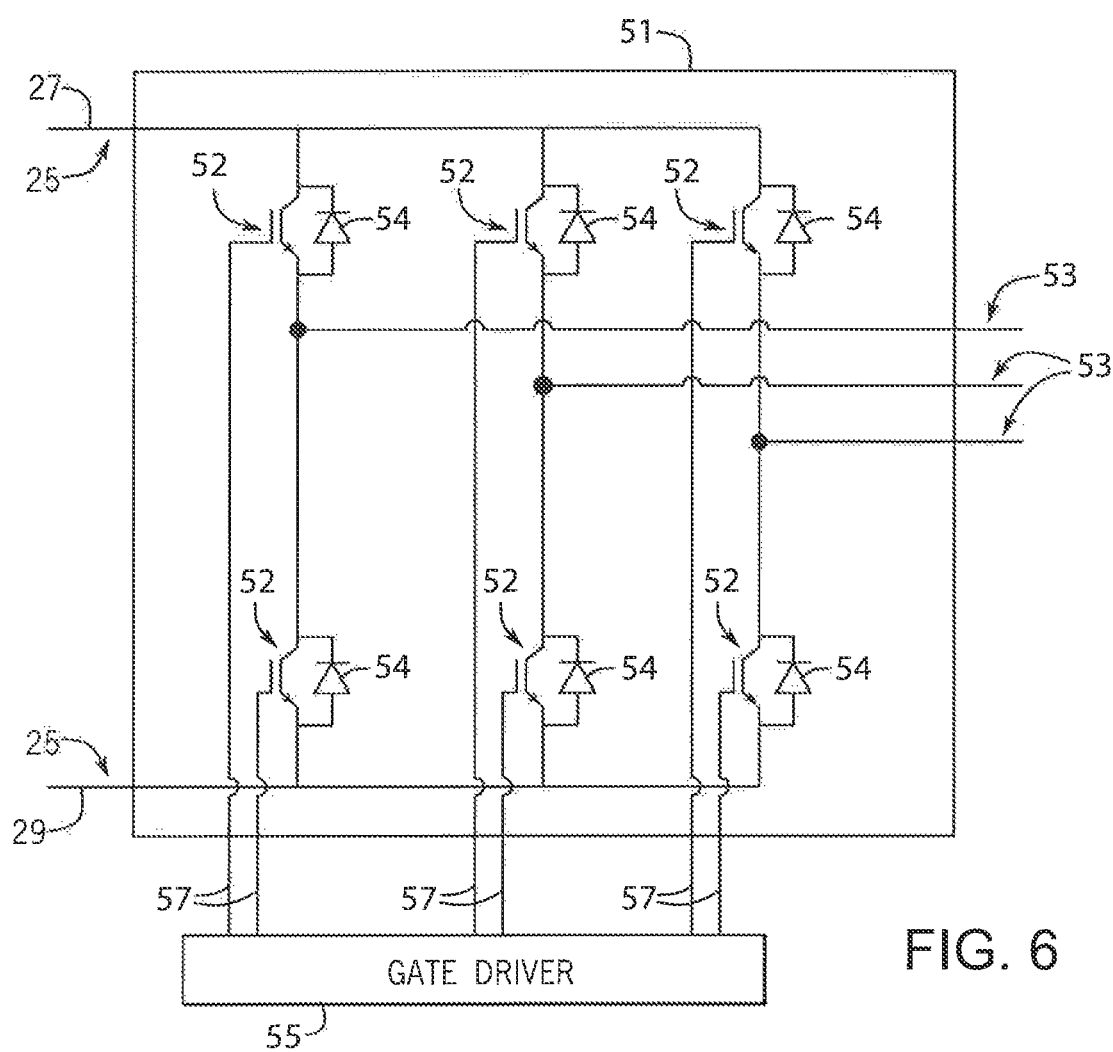
FIG. 6. is a schematic representation of a inverter section that may be incorporated into the motor drive of FIG. 1 or 3.

The motor drive 11 may also include a DC bus capacitance 56 connected between the positive and negative rails, 27 and 29, to reduce the magnitude of the ripple voltage resulting from converting the AC voltage to a DC voltage and to provide some ride through in the event of variation in the voltage level present on the DC bus 25. It is understood that the DC bus capacitance 56 in the motor drive 11 may be a single capacitor or multiple capacitors connected in parallel, in series, or a combination thereof. Optionally, all or a portion of the DC bus capacitance 56 may be provided in the front-end rectifier 20. The DC bus 25 is connected in the motor drive 11 to an inverter section 51. Referring also to FIG. 6, the inverter section 51 consists of switching elements, such as transistors, thyristors, or SCRs as is known in the art. The illustrated inverter section 51 includes IGBTs 52 and a free-wheeling diode 54 connected in pairs between the positive rail 27 and each phase of the output voltage as well as between the negative rail 29 and each phase of the output voltage. Each of the IGBTs 52 receives gating signals 57 to selectively enable the transistors 52 and to convert the DC voltage from the DC bus 25 into a controlled three phase output voltage to the motor 40. When enabled, each transistor 52 connects the respective rail 27, 29 of the DC bus 25 to an electrical conductor 53 connected between the transistor 52 and the output of the motor drive 11. The electrical conductor 53 is selected according to the application requirements (e.g., the rating of the motor drive 11) and may be, for example, a conductive surface on a circuit board to which the transistors 52 are mounted or a bus bar connected to a terminal from a power module in which the transistors 52 are contained. The output of the motor drive 11 may be connected to the motor 40 via a cable 37 including electrical conductors connected to each of the output terminals 35.

One or more modules are used to control operation of the motor drive 11. The modules may be stored programs executed on a processor, logic circuits, or a combination thereof. The modules used to control operation of the motor drive 11 will be referred to herein generally as a control circuit. According to the illustrated embodiment, the control circuit of the illustrated motor drive 11 includes a motor interface circuit 154, a non-transitory storage device, or memory 150, a processor 152, and a switch mode power supply (SMPS) 160. It is contemplated that the control circuit may include additional devices, such as a dedicated processor or gate driver circuit 55 (as shown in FIG. 6) to generate gate signals 57, buffers, analog-to-digital converters, and the like as may be needed to control operation of the motor drive. The non-transitory storage device, or memory 150, is configured to store data and programs, which include a series of instructions executable by the processor 152. It is contemplated that the memory 150 may be a single device, multiple devices, or incorporated, for example, as a portion of another device such as an application specific integrated circuit (ASIC). The processor 152 is in communication with the memory 150 to read the instructions and data as required to control operation of the motor drive 11. The processor 152 receives feedback signals from sensors indicating the present operation of the motor drive 11. The feedback signals may include, but are not limited to, the magnitude of voltage and/or current present on the DC bus 25 or at the output 53 of the inverter section 51, as supplied to the motor 40. The feedback signals may also include position feedback, temperature feedback, or brake status signals from the motor 40 received at the motor interface circuit 154. Optionally, the motor drive 11 may also transmit, for example, a brake release signal via the motor interface circuit 154 to the motor 40. It is contemplated that the motor drive 11 may utilize one of many various methods of controlling operation of the motor 40 as is understood in the art without deviating from the scope of the invention.

Figure 3:
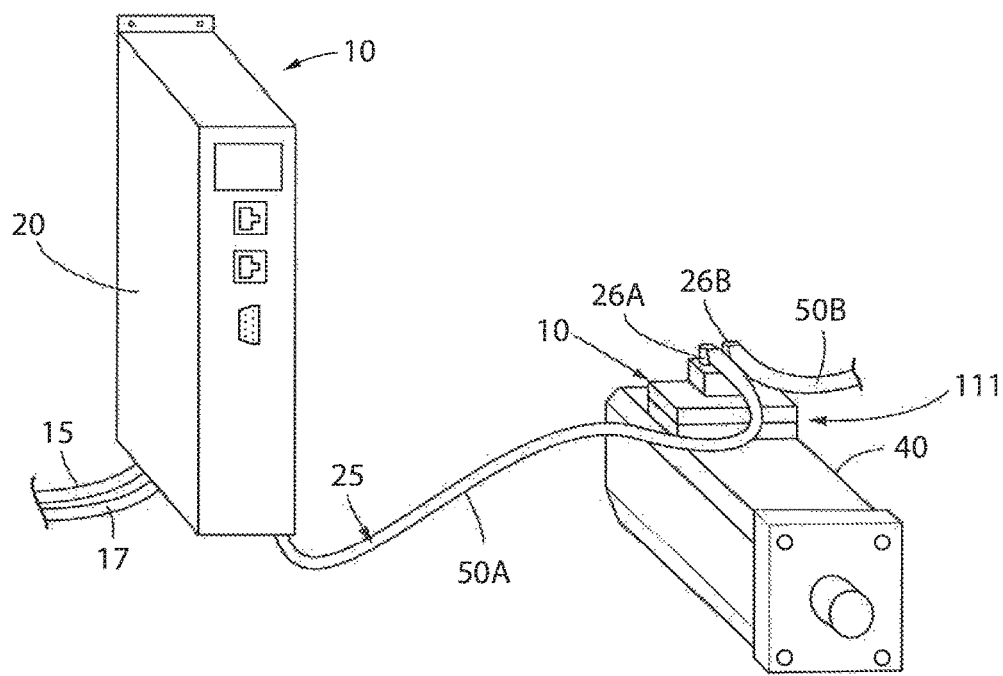
FIG. 3 is an exemplary motor, integrated motor drive, and front-end rectifier incorporating another embodiment of the present invention.

The SMPS 160 is configured to operate over a wide range of input voltages. The SMPS 160 may receive the control voltage, for example at 48 VDC from the control power supply 130 or, alternatively, may receive DC bus voltage at 680 VDC, or greater. The SMPS 160 converts the input voltage to control voltages such as 5 VDC, 3.3 VDC, or any other DC voltage required by control circuits within the motor drive 11. The SMPS includes a switch 161, which may be implemented by a transistor that is selectively opened and closed to establish conduction through a transformer 162. The transformer 162 includes a primary winding 164 and at least one secondary winding 166. The transformer provides electrical isolation between the primary winding 164 and each secondary winding 166. The switch 161 may be controlled and operative in combination with a turns-ratio between the primary 164 and one of the secondary windings 166 to supply each of the desired control voltages (e.g., 5 VDC or 3.3 VDC) within the motor drive 11. The control voltages are used to power, for example, the memory 150, the processor 152, and other logic, control, or electronic elements within the control circuit. Turning next to FIGS. 3 and 4, a second exemplary motor control system 10, which may be used in conjunction with the various embodiments of the invention disclosed herein, is illustrated. In a manner similar to the motor control system illustrated in FIG. 1, the motor control system 10 in FIG. 3 includes a front-end rectifier 20 and a motor drive 111. The front-end rectifier 20 is configured to receive a three-phase AC voltage 15 at an input to the rectifier 20, and to provide a DC voltage on a DC bus 25 as an output of the rectifier 20. The rectifier 20 may include any electronic device suitable for passive or active rectification as is understood in the art. The magnitude of the DC voltage between the negative and positive rails, 29 and 27, is generally equal to or boosted above the magnitude of the peak of the AC input voltage. One or more motor drives 111 may be connected to the DC bus 25 to receive the DC voltage present on the bus and to use the DC voltage to control one or motors connected to each motor drive 111.

Figure 10:
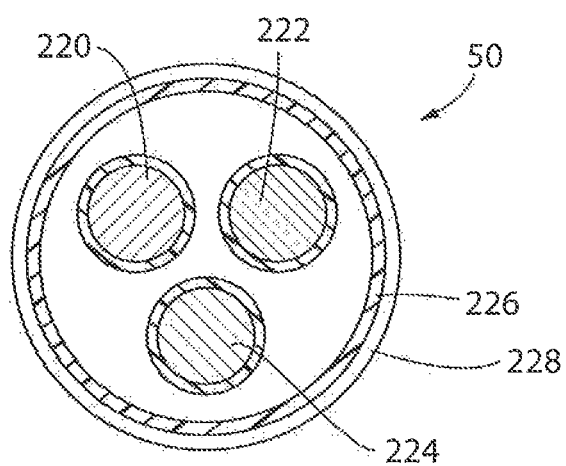
FIG. 10 is a sectional view of a DC bus cable used in FIG. 3.

Unlike the motor control system 10 illustrated in FIG. 1, the motor drive 111 illustrated in FIG. 3 is mounted to the motor 40. Just as with FIG. 1, a single motor drive 111 is shown in FIG. 3 being connected to the front-end rectifier 20. A DC bus cable 50A extends between the front-end rectifier 20 and the integrated motor drive 111. With reference also to FIG. 10, the DC bus cable 50 includes a first conductor 220 and a second conductor 222 which serve as the positive and negative rails 27, 29 of the DC bus 25. A third conductor 224 may also be provided which establishes a ground connection between the front-end rectifier 20 and each motor drive 111. The DC bus cable 50 include an outer jacket 228 to insulate the cable 50 and may include a shield 226 surrounding the conductors. The first and second conductors 220, 222 provide the positive and negative rails 27, 29 of the DC bus 25 from the rectifier 20 to the motor drive 111. Optionally, an additional DC bus cable 50B may connected to the motor drive 111 to than a daisy chain connection and pass the DC bus 25 on to an additional motor drive 111, not shown. Other than the mounting location, the motor drive 111 is configured in a manner similar to the motor drive shown and discussed above with respect to FIGS. 1 and 2. Because the motor drive 11 is mounted to the motor 40, connections between the motor drive 111 and the motor 40 may be made via short leads or bus bars internal to the housings of the drive and motor.

In operation, the DC bus 25 is operative to provide either control voltage or DC bus voltage from a source, such as the front-end rectifier 20, to one or more loads, such as the motor drives 11 or 111 over a shared set of conductors. By providing both control voltage and DC bus voltage over a single set of conductors, the total wire count is reduced, which, in turn, simplifies the interconnection between devices, cost of materials, and reduces the potential for errors in wiring. Further, because the number of conductors within the cable is reduced, the weight of the cable is reduced and the flexibility of the cable is increased, which again simplifies the interconnection between devices and may improve routing of cables.

In a first operating mode, the front-end rectifier 20 supplies control power to each of the motor drives 11 or 111 without having the DC bus voltage present. This may be desirable, for example, during installation or commissioning. The motor drive 11 requires control power to energize the processor 152 and memory 150. Similarly, if a user interface, network interface, or other communication interface is present, the interface similarly requires control power. A technician is able to configure operation of the motor drive 11 via the interface, for example, by pressing buttons to directly adjust parameters displayed on a user interface, by downloading a set of parameters, or by interacting with an application executing on a mobile computing device connected to or located proximate the motor drive 11. Optionally, a technician may be in a location or facility remotely located from the motor drive 11 and connected via one or more suitable networks, such as the Internet, an intranet, or a dedicated industrial network. The control power enables the processor 152 to execute instructions stored in the memory 150 and to read and/or adjust parameter settings stored in memory 150.

Similarly, it may be desirable for the motor drive 11 to initially power-up with just control power present prior to having DC bus voltage present on the DC bus 25. At power-up, the motor drive 11 may perform initial diagnostic tests on the motor drive 11 to verify that the motor drive is properly configured or that the electronic components of the motor drive 11 are operating normally. After completing the initial diagnostic tests, the motor drive 11 may set a flag or transmit a message to the front-end rectifier 20 indicating it is ready to receive the DC bus voltage. In either event, the control power is required to power the control circuit and other control elements present in the motor drive 11.

During this first operating mode, the control power supply 130 or voltage regulator 144 receives the control voltage 17 and is operative to provide the control voltage at its respective output. For discussion purposes, a 48 VDC voltage will be output from the control power supply 130 or voltage regulator 144. Optionally, an external power supply may provide the 48 VDC control voltage directly to the input 17 of the front-end rectifier. It is contemplated that various other control voltages, such as 24 VDC may be output from the power supply 130 or voltage regulator 144 without deviating from the scope of the invention. The positive output terminal from the power supply 130 or regulator 144 is connected via a first diode 140 to the positive rail 27 of the DC bus 25. The first diode 140 is connected such that it is forward biased when the 48 VDC is present on the positive output terminal of the control power supply 130 or voltage regulator 144 and no DC bus voltage is present on the DC bus 25. The anode of the first diode 140 is connected to the power supply, voltage regulator 144, or directly to the input control voltage 17 and the cathode of the first diode 140 is connected to the positive rail 27 of the DC bus 25. The negative terminal from the power supply 130 or regulator 144 is connected via a second diode 142 to the negative rail 29 of the DC bus 25. The second diode 142 is connected such that is also forward biased when the 48 VDC is present on the positive output terminal of the control power supply 130 or voltage regulator 144 and no DC bus voltage is present on the DC bus 25. The anode of the second; diode 142 is connected to the negative rail 29 of the DC bus 25 and the cathode of the second diode 142 is connected to the power supply, voltage regulator 144, or directly to the input control voltage 17. With no DC bus voltage present, the first and second diodes 140, 142 are forward biased and allow the power supply 130 or voltage regulator 144 to supply control power to each motor drive 11 connected via the DC bus 25.

During this first operating mode, it is anticipated that each motor drive 11 requires only sufficient power to energize the control circuits within the motor drive 11. Because there is no DC bus voltage present, the motor drives 11 will not be controlling operation of their respective motors. As a result, external devices mounted on the motors, such as motor brakes and/or fans, will not need power for operation either. For example, the opening and holding current required to energize a brake coil is not necessary, reducing the power requirements of each node connected to the DC bus 25, where the node includes a motor drive 11 corresponding motor 40, and external devices connected to the motor. The reduced power requirements of each node allow more nodes to be connected to a single front-end rectifier than if the control power is required to energize motor brakes and the like.

Figure 7:
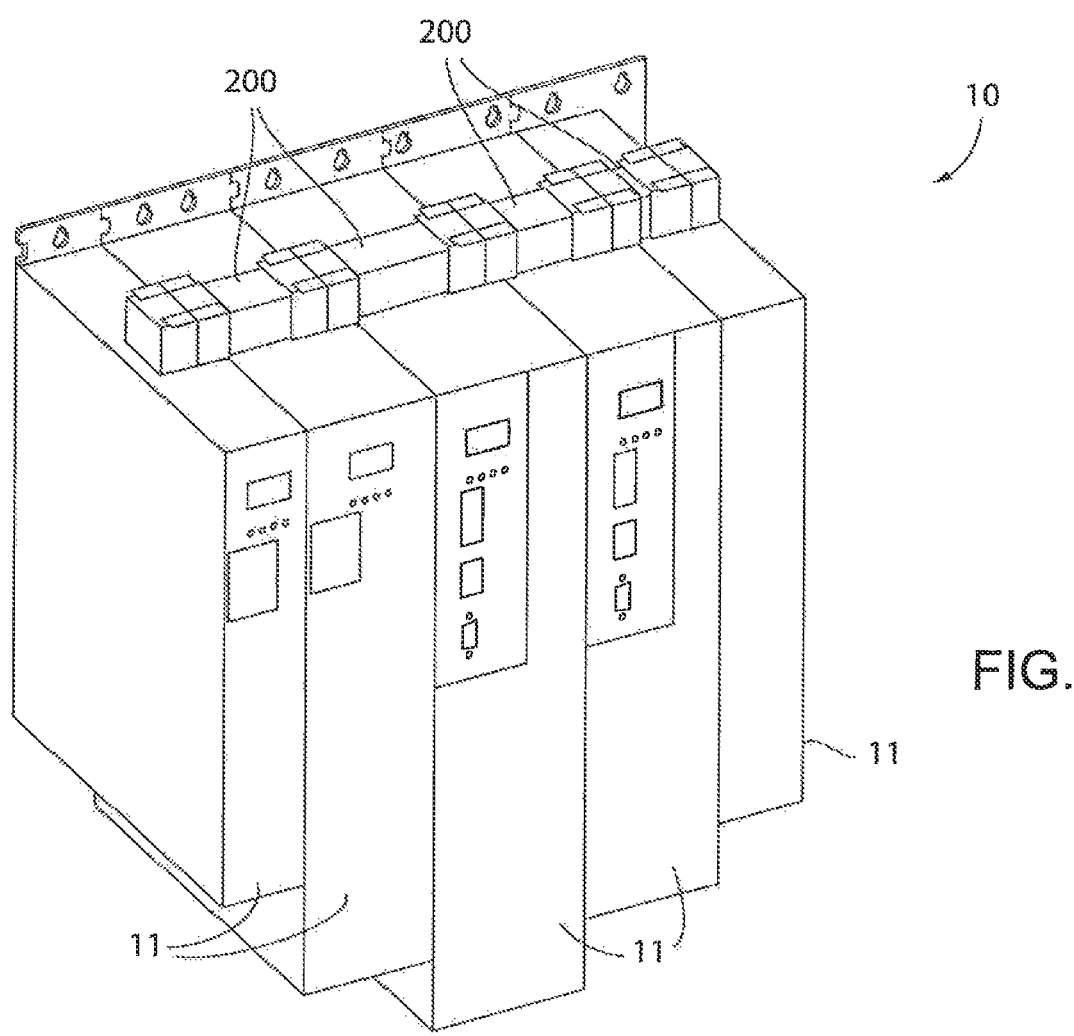
FIG. 7 is a perspective view of multiple motor drives and a DC bus connector supplying a DC bus to each of the motor drives according to one embodiment of the invention.
Figure 8:
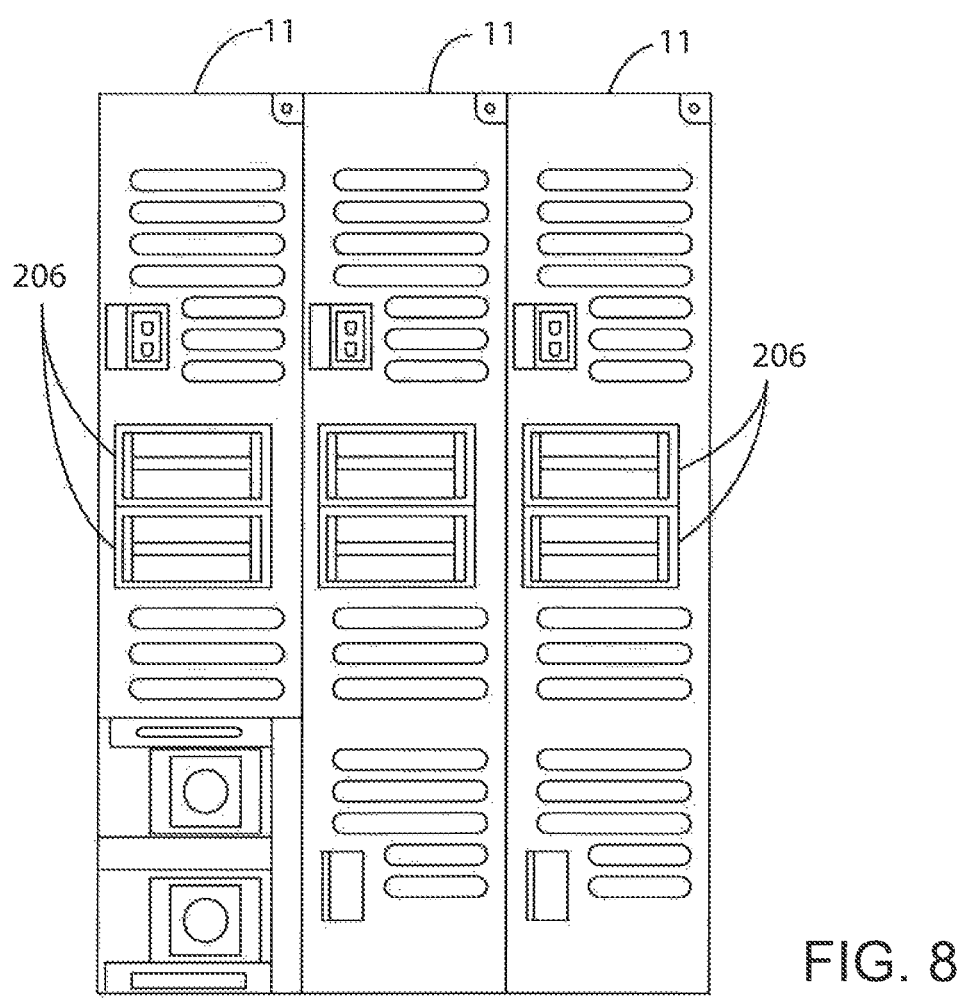
FIG. 8 is a top plan view of the motor drives of FIG. 7.
Figure 9:
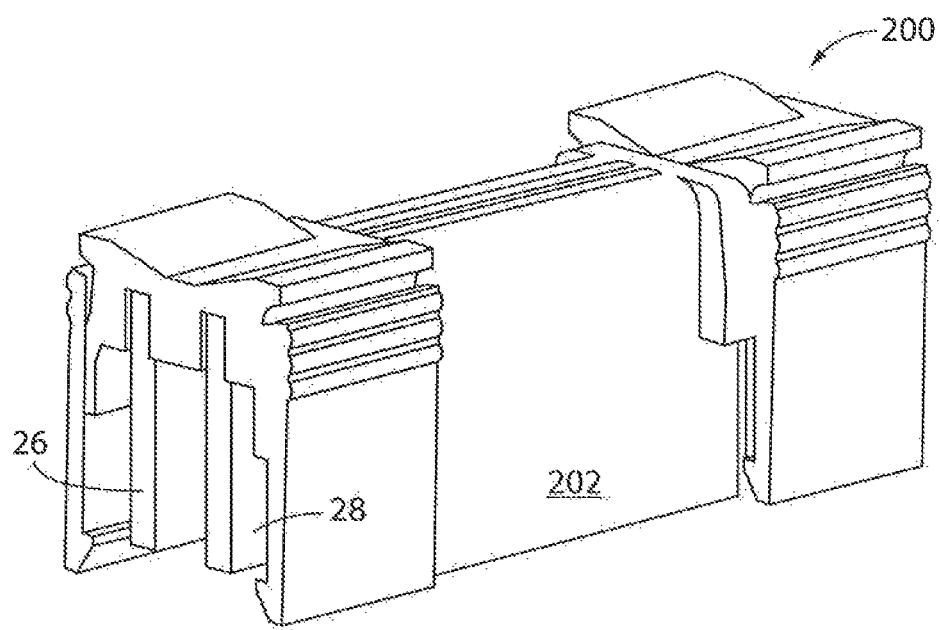
FIG. 9 is a perspective view of the DC bus connector of FIG. 7.

Additionally, the control power is supplied via the DC bus 25 connection between the front-end rectifier 20 and each motor drive 11. As shown in FIG. 7, this connection may be made via a DC bus connection member 200 which includes a pair of bus bars 26, 28 as shown in FIG. 9. Alternately, this connection may be made via a DC bus cable 50A or 50B, as shown in FIG. 3, where the DC bus cable 50, as shown in FIG. 10, includes a pair of conductors 220, 222. The cross section of the bus bars 26, 28 or the wire size for the conductors 220, 222 is selected appropriately to handle the current rating required to supply power to each motor 40 and motor drive 11 combination that is connected for the DC bus 25. The power requirements for the motor 40 are substantially greater than the requirements for control power and, therefore, the cross-section or the size of the wire are selected accordingly. As a result, during the first operating mode, the cross-section of the bus bars 26, 28 or the size of the wire required for the conductors 220, 222 is substantially greater than a corresponding conductor that previously would have been selected if the conductor were dedicated to conducting control power. The value of the resistance per unit length of these bus bars 26, 28 or conductors 220, 222 is similarly reduced in comparison to a corresponding conductor that previously would have been selected if the conductor were dedicated to conducting control power. The voltage drop along the DC bus bars 26, 28 or conductors 220, 222 sized to conduct the current for operation of the motors 40 is less than conductors that previously would have been selected just to conduct current for the control power and, therefore, this also allows additional nodes to be connected to the DC bus 25 and to receive control power from the front-end rectifier 20.

In a second operating mode, the AC voltage 15 is present at the front-end rectifier 20 and the rectifier section 21 is operative to supply DC bus voltage on the DC bus 25. The magnitude of the DC bus voltage between the negative and positive rails, 29 and 27, is generally equal to or boosted above the magnitude of the peak of the AC input voltage. If passive rectification occurs in the rectifier section 21, the magnitude of the DC bus voltage is approximately equal to the peak value of the AC input voltage. For example, a 230 VAC input voltage yields a DC bus voltage of about 325 VDC and a 460 VAC input voltage yields a DC bus voltage of about 650 VDC. If the rectifier section 21 has an active rectifier, it may be desirable to boost the DC bus voltage slightly above the peak value of the AC input voltage, such that the DC bus voltage may be, for example, 350 VDC or 700 VDC for a 230 VAC or 460 VAC input voltage, respectively. Regardless of whether the DC bus voltage is supplied via passive or active rectification, the amplitude of the DC bus voltage is substantially greater than the 48 VDC output from the control power supply 130 or voltage regulator 144. When the DC bus voltage is present on the DC bus 25, therefore, the first and second diodes 140, 142 become reverse biased, preventing current flow through the control power supply 130 or voltage regulator 144.

Because the control power is no longer supplied via the DC bus 25 to the motor drives 11, each motor drive 11 must be able to utilize the DC bus voltage at, for example, 325 VDC or 650 VDC in addition to the control voltage at 48 VDC to generate internal motor drive control voltages within the motor drive 11. Each motor drive includes a SMPS 160 configured to operate over a wide range of input voltages. The SMPS provides the internal control voltages, such as 3.3 VDC or 5 VDC, for the motor drive 11 to power the processor 152, memory 150, and the like. The input of the SMPS 160 is connected to the DC bus 25 and, therefore, during the first operating mode, the SMPS 160 receives the 48 VDC control voltage and in the second operating mode, the SMPS 160 receives the 325 VDC or 650 VDC bus voltage. In either operating mode, the SMPS is configured to supply the necessary control voltage (e.g., 3.3 VDC or 5 VDC) for operation of the motor drive 11.

According to still another aspect of the invention, it is contemplated that communication between the front-end rectifier 20 and each motor drive 11 may additional be performed via the DC bus conductors. Both the front-end rectifier 20 and the motor drive 11 may include a transceiver in their respective control circuits, where the transceiver is configured to communicate via a power line. The transceiver may, for example, modulate a carrier signal on top of the control voltage or on top of the DC bus voltage at a transmitting device and the receiving device is configured to receive and decode the modulated signal. Data packets may be passed between the two devices via the DC bus conductors, thereby further reducing the wiring between the front-end rectifier 20 and each motor drive 11.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:
1. A distributed DC bus system, comprising:
a first input configured to receive an AC input voltage;
a rectifier section operative to convert the AC input voltage to a DC bus voltage having a first amplitude;
a DC bus electrically connected to the rectifier section and operative to receive the DC bus voltage;

a control power supply configured to output a DC control voltage, wherein the DC control voltage is less than the DC bus voltage;
a pair of diodes operatively connected between the control power supply and the DC bus, wherein:
the pair of diodes are operatively connected to be forward biased when the DC control voltage is present in the distributed DC bus system and the DC bus voltage is not present on the DC bus to provide the DC control voltage to the DC bus, and
the pair of diodes are operatively connected to be reverse biased when the DC control voltage is present in the distributed DC bus system and the DC bus voltage is present on the DC bus to prevent the DC control voltage from being provided to the DC bus; and
at least one motor drive operatively connected to the DC bus, wherein each motor drive includes:
an inverter section electrically connected to the DC bus to receive the DC bus voltage as an input and to provide an AC voltage as an output;
a power supply electrically connected to the DC bus, wherein the power supply is operative to receive either the DC bus voltage or the DC control voltage present on the DC bus as an input voltage and to output a motor drive control voltage; and
a control circuit configured to receive the motor drive control voltage to enable operation of the control circuit.

2. The distributed DC bus system of claim 1 further comprising a second input, wherein:
the control power supply is an external power supply,
the second input is configured to receive the DC control voltage from the external power supply, and
the pair of diodes are operatively connected between the second input and the DC bus.

3. The distributed DC bus system of claim 1 further comprising:
a second input, wherein the second input is configured to receive a second input voltage; and
the control power supply is operatively connected to the second input to receive the second input voltage at an input to the control power supply and to generate the DC control voltage as an output from the control power supply, wherein the pair of diodes are operatively connected between the output from the control power supply and the DC bus.

4. The distributed DC bus system of claim 1 further comprising:
a rectifier front end, wherein the rectifier front end includes the first input, the rectifier section, and the pair of diodes, the rectifier section further comprising:
a first conductor and a second conductor, wherein the first and second conductors are electrically connected between an output of the rectifier section and the DC bus; and
a third conductor and a fourth conductor, wherein the third and fourth conductors are electrically connected between the pair of diodes and the DC bus.

5. The distributed DC bus system of claim 4 wherein the at least one motor drive is mounted adjacent to the rectifier front end, the distributed DC bus system further comprising a first DC bus bar and a second DC bus bar, wherein the first and second DC bus bars define the DC bus and are electrically connected between a first pair of DC bus connectors on the rectifier front end and a second pair of DC bus connectors on the at least one motor drive.

6. The distributed DC bus system of claim 4 wherein the at least one motor drive is mounted remotely from the rectifier front end, the DC bus system further comprising a DC bus cable, wherein the DC bus cable includes at least two conductors defining the DC bus and the DC bus cable is electrically connected between a first pair of DC terminals on the rectifier front end and a second pair of DC bus terminals on the at least one motor drive.

7. The distributed DC bus system of claim 4, wherein the rectifier front end further comprises a communication circuit operative to generate a plurality of data packets, wherein an output of the communication circuit is operatively connected to the DC bus to transmit the plurality of data packets to the at least one motor drive via the DC bus.

8. A distributed DC bus system, comprising:
a first input configured to receive an AC input voltage;
a rectifier section operative to convert the AC input voltage to a DC voltage having a first amplitude;
a DC bus electrically connected to the rectifier section and operative to receive the DC bus voltage; and
a pair of diodes operatively connected between a control power supply configured to output a DC control voltage and the DC bus, wherein:
the DC control voltage is less than the DC bus voltage,
the pair of diodes are operatively connected to be forward biased when the DC control voltage is present in the distributed DC bus system and the DC bus voltage is not present on the DC bus,
the pair of diodes are operatively connected to be reverse biased when the DC control voltage is present in the distributed DC bus system and the DC bus voltage is present on the DC bus,
the DC bus is configured to be electrically connected between the rectifier section and at least one motor drive,
the at least one motor drive includes:
an inverter section operative to output an AC output voltage from the DC bus voltage received as an input,
a power supply operative to output a motor drive control voltage from either the DC bus voltage or the DC control voltage present on the DC bus, and
a control circuit configured to receive the motor drive control voltage to enable operation of the control circuit.

9. The distributed DC bus system of claim 8 further comprising a second input, wherein:
the control power supply is an external power supply,
the second input is configured to receive the DC control voltage from the external power supply, and
the pair of diodes are operatively connected between the second input and the DC bus.

10. The distributed DC bus system of claim 8 further comprising:
a second input, wherein the second input is configured to receive a second input voltage; and
the control power supply is operatively connected to the second input to receive the second input voltage and to generate the DC control voltage as an output from the control power supply, wherein the pair of diodes are operatively connected between the output from the control power supply and the DC bus.

11. The distributed DC bus system of claim 8 further comprising:
a rectifier front end, wherein the rectifier front end includes the first input, the rectifier section, and the pair of diodes, the rectifier front end further comprising:

a first conductor and a second conductor, wherein the first and second conductors are electrically connected between an output of the rectifier section and the DC bus; and a third conductor and a fourth conductor, wherein the third and fourth conductors are electrically connected between the pair of diodes and the DC bus.

12. The distributed DC bus system of claim 11, wherein the rectifier front end further comprises a communication circuit operative to generate a plurality of data packets, wherein an output of the communication circuit is operatively connected to the DC bus to transmit the plurality of data packets to the at least one motor drive via the DC bus.

13. A distributed DC bus system, comprising:

a DC bus electrically connected to a rectifier front end and operative to selectively receive one of a DC bus voltage and a DC control voltage, wherein the DC bus voltage is output from a control power supply and the DC bus voltage is output from a rectifier section; and at least one motor drive operatively connected to the DC bus, wherein each motor drive includes:

an inverter section electrically connected to the DC bus to receive the DC bus voltage as an input and to provide an AC voltage as an output;

a power supply electrically connected to the DC bus, wherein the power supply is operative to output a motor drive control voltage from either the DC bus voltage or the DC control voltage present on the DC bus; and a control circuit configured to receive the motor drive control voltage to enable operation of the control circuit.

14. The distributed DC bus system of claim 13, wherein:

the rectifier section is operative to convert an AC input voltage to the DC bus voltage having a first amplitude, the rectifier front end is further operative to selectively provide the DC bus voltage from the rectifier section and the DC control voltage from the control power supply on the DC bus, and the DC control voltage has a second amplitude less than the first amplitude.

15. The distributed DC bus system of claim 13 wherein:

the rectifier front end includes a pair of diodes, the pair of diodes are operatively connected to be forward biased when the DC control voltage is present in the distributed DC bus system and the DC bus voltage is not present on the DC bus, the pair of diodes are operatively connected to be reverse biased when the DC control voltage is present in the distributed DC bus system and the DC bus voltage is present on the DC bus, and the pair of diodes selectively connect the DC control voltage to the DC bus.

16. The distributed DC bus system of claim 15 wherein:

the rectifier front end includes an input configured to receive the DC control voltage from an external power supply, and the pair of diodes are operatively connected between the input and the DC bus.

17. The distributed DC bus system of claim 15 wherein:

the rectifier front end includes an input;

the input is configured to receive an input voltage other than the DC control voltage;

the rectifier front end includes the control power supply operatively connected to the input to receive the input voltage and to generate the DC control voltage as an output from the control power supply; and the pair of diodes are operatively connected between the output from the control power supply and the DC bus.

18. The distributed DC bus system of claim 13 wherein the at least one motor drive is mounted adjacent to the rectifier front end, the distributed DC bus system further comprising a first DC bus bar and a second DC bus bar, wherein the first and second DC bus bars define the DC bus and are electrically connected between a first pair of DC bus connectors on the rectifier front end and a second pair of DC bus connectors on the at least one motor drive.

19. The distributed DC bus system of claim 13 wherein the at least one motor drive is mounted remotely from the rectifier front end, the DC bus system further comprising a DC bus cable, wherein the DC bus cable includes at least two conductors defining the DC bus and the DC bus cable is electrically connected between a first pair of DC terminals on the rectifier front end and a second pair of DC bus terminals on the at least one motor drive.

20. The distributed DC bus system of claim 13, wherein the at least one motor drive further comprises a communication circuit operatively connected to the DC bus to receive a plurality of data packets from the rectifier front end, wherein the plurality of data packets are transmitted to the at least one motor drive via the DC bus.

* * * * *